Figure 2:
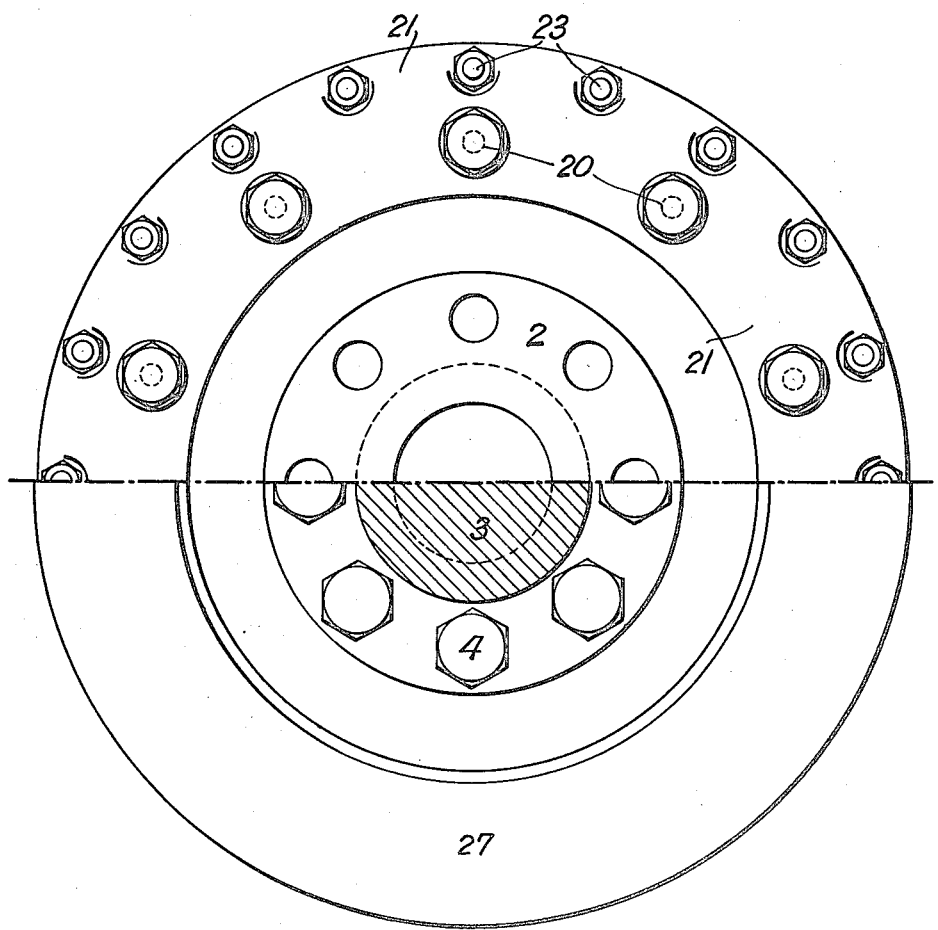

T. H. MATTHEWS AND H. W. LEE.
CLUTCH FOR TURBINE DRIVEN GEARED PROPELLER SHAFTS.
APPLICATION FILED JULY 20, 1920.
1,380,823.
Patented June 7, 1921.
3 SHEETS—SHEET 1.
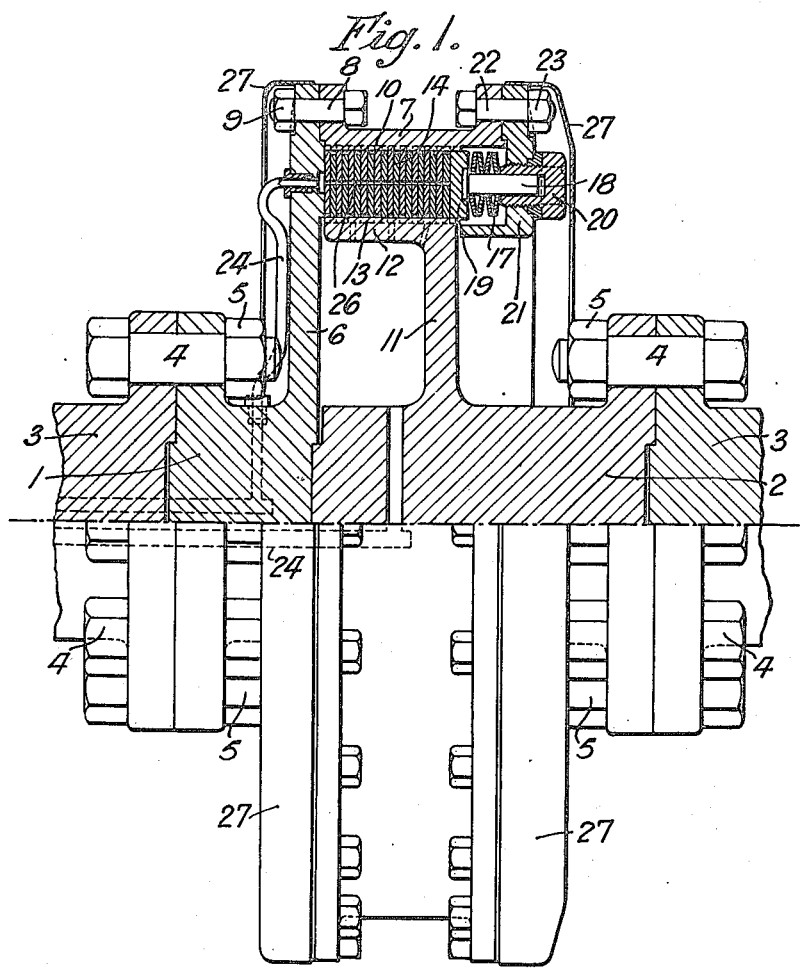
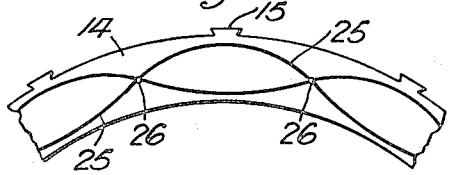
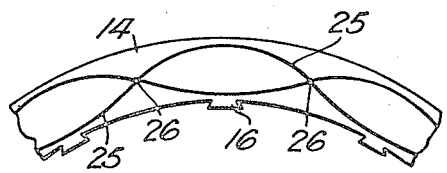

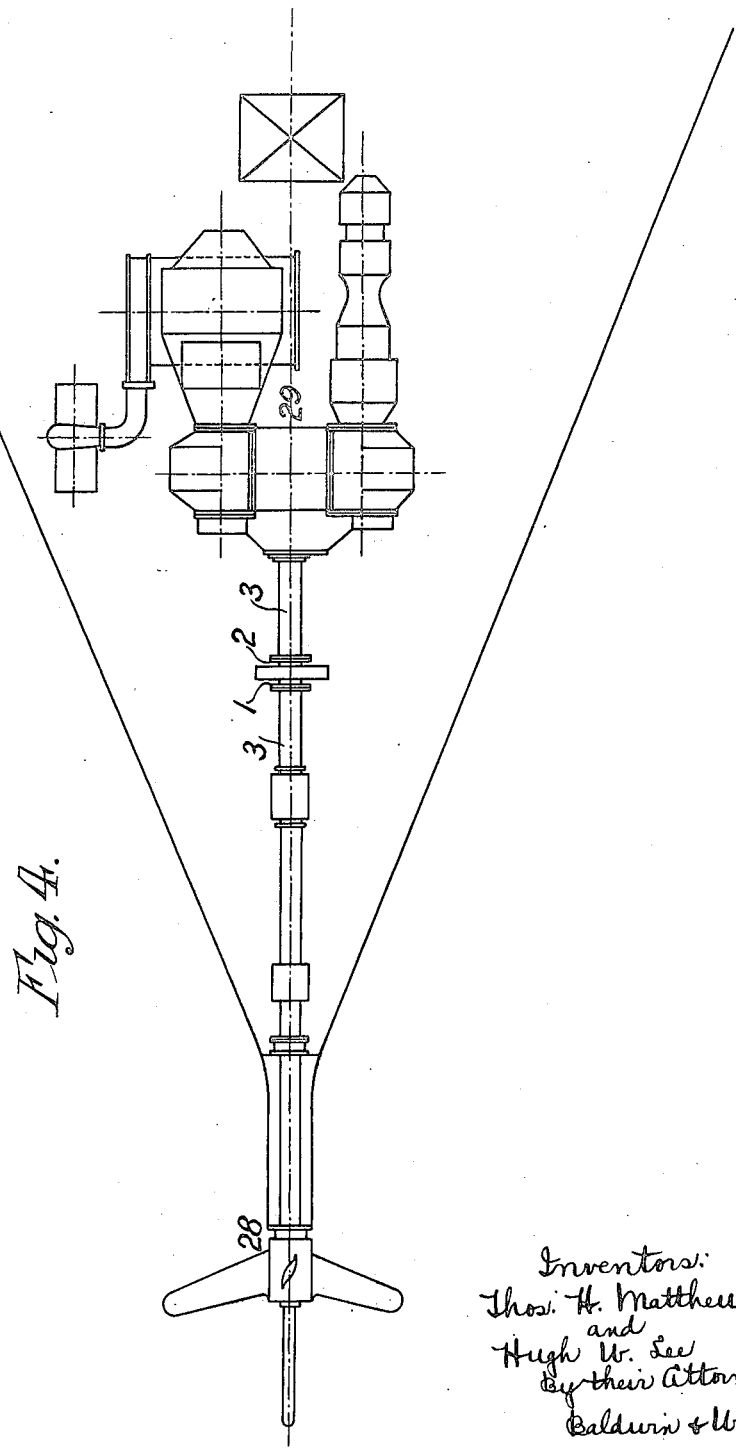

UNITED STATES PATENT OFFICE.

THOMAS HUMPHREY MATTHEWS AND HUGH WARREN LEE, OF NEWCASTLE-UPON-TYNE, ENGLAND, ASSIGNORS TO SIR W. G. ARMSTRONG, WHITWORTH AND COMPANY, LIMITED, OF ELSWICK WORKS, NEWCASTLE-UPON-TYNE, ENGLAND.

CLUTCH FOR TURBINE-DRIVEN GEARED PROPELLER-SHAFTS.

1,380,823. Specification of Letters Patent. Patented June 7, 1921.

Application filed July 20, 1920. Serial No. 397,640.

*To all whom it may concern:*

Be it known that we, THOMAS HUMPHREY MATTHEWS and HUGH WARREN LEE, subjects of the King of Great Britain, residing at Elswick Works, Newcastle-upon-Tyne, England, have invented a new and useful Improved Clutch for Turbine-Driven Geared Propeller-Shafts, of which the following is a specification.

This invention relates to improvements in turbine driven geared propeller shafts.

According to this invention we employ a multiple disk clutch to prevent the transmission to the gear wheels of any extra load or jar which may be sustained by the propeller. Preferably the clutch forms a coupling in a length of the propeller shaft, or may be arranged between the propeller shaft and the last wheel of the train of reducing gear from the turbine.

In carrying out our invention as applied to a propeller shaft coupling, the end of each shaft is provided with a flange which forms the inner or the outer member of a clutch, and multiple disks are contained in the annular space between the flanges, the pressure of the disks against each other being regulated by means of bolts bearing against spring washers.

Our invention is illustrated in the drawings in which Figure 1 is a side elevation half in section of a clutch, Fig. 2 is an end view of Fig. 1 with the cover removed in the upper half, Fig. 3 shows in elevation part of two alternate friction disks and Fig. 4 is a diagrammatic plan view of a geared turbine installation on board a ship.

Referring more particularly to Figs. 1 and 2, 1 and 2 are two half couplings which are bolted direct to a propeller shaft 3 by bolts 4 and nuts 5. The half coupling 1 is provided with a flange 6 to which is secured a ring or sleeve 7 by means of bolts 8 and nuts 9. Formed in the interior surface of the ring 7 are keyways 10. The other half coupling 2 is also provided with a flange 11 having a ring or sleeve 12 on the external surface of which keyways 13 are cut. Between the rings 7 and 12 are arranged a plurality of friction disks 14, every alternate disk having projections 15 which fit into the keyways 10 of the external ring 7 and the remainder having projections 16 which fit into the keyways 13 of the internal ring 12, the disks 14 being free to move parallel with the axis of the clutch. The necessary friction between the disks 14 is obtained by means of a plurality of spring washers 17, threaded on pins 18 located in a ring 19, and compressed to the requisite extent by means of bolts 20 screwing into a flanged plate 21 secured to the external ring 7 by means of bolts 22 and nuts 23. By this means the clutch can be set to transmit without slipping, the normal horse power.

Lubrication may be circulated through oil passages 24 to the disk 14 which are provided with oil grooves 25 and holes 26 drilled through at the point of intersection of the grooves. 27 are covers.

In Fig. 3 the clutch is shown connected to a propeller shaft 3 between a propeller 28 and a geared turbine installation 29.

What we claim is:—

1. The combination of a propeller, a divided propeller shaft, a clutch connected to said shaft, a geared turbine, and means adapted both to prevent the clutch from slipping when transmitting the drive and to prevent damage to the gearing by allowing slip when the propeller is unduly strained.

2. The combination of a propeller, a geared turbine, a divided propeller shaft, a clutch comprising two half couplings fixed to the propeller shaft, concentric rings on said couplings coaxial with the propeller shaft, and means connecting said rings and adapted both to prevent the clutch from slipping when transmitting the drive, and to prevent damage to the gearing by allowing slip when the propeller is unduly strained.

3. The combination of a propeller, a geared turbine, a divided propeller shaft, a clutch comprising two half couplings, fixed to the propeller shaft, concentric rings on said couplings coaxial with the propeller shaft, a plurality of disks whereof each alternate disk engages with one ring while the remainder engage with the other ring, and means adapted to force the disks into contact with each other so as both to prevent the clutch from slipping when transmitting the drive, and to prevent damage to the gearing by allowing the clutch to slip when the propeller is unduly strained.

4. The combination of a propeller, a geared turbine, a divided propeller shaft, a clutch comprising two half couplings, fixed to the propeller shaft, concentric rings on said couplings coaxial with the propeller shaft, a plurality of disks whereof each alternate disk engages with one ring while the remainder engage with the other ring, a plurality of springs, and adjustable means adapted to compress said springs and to force the disks into contact with each other so as both to prevent the clutch from slipping when transmitting the drive, and to prevent damage to the gearing by allowing the clutch to slip when the propeller is unduly strained.

5. The combination of a propeller, a geared turbine, a divided propeller shaft, a clutch comprising two half couplings, fixed to the propeller shaft, concentric rings on said couplings coaxial with the propeller shaft, a plurality of disks whereof each alternate disk engages with one ring while the remainder engage with the other ring, a plurality of springs, and a plurality of bolts adapted to compress said springs and to force the disks into contact with each other so as both to prevent the clutch from slipping when transmitting the drive, and to prevent damage to the gearing by allowing the clutch to slip when the propeller is unduly strained.

In testimony that we claim the foregoing as our invention we have signed our names this fifth day of July, 1920.

THOMAS HUMPHREY MATTHEWS.
HUGH WARREN LEE.